United States Patent [19]
Kimizuka

[11] Patent Number: 6,000,295
[45] Date of Patent: Dec. 14, 1999

[54] GEAR

[75] Inventor: Genichi Kimizuka, Kawaguchi, Japan

[73] Assignee: Enplas Corporation, Saitama, Japan

[21] Appl. No.: 08/998,902

[22] Filed: Dec. 29, 1997

[30] Foreign Application Priority Data

Dec. 27, 1996 [JP] Japan ..................... 8-358748

[51] Int. Cl.$^6$ ................................ F16H 55/17
[52] U.S. Cl. ........................ 74/434; 74/DIG. 10
[58] Field of Search ............... 74/431, 434, 446, 74/447, DIG. 10

[56] References Cited

U.S. PATENT DOCUMENTS

| | | | |
|---|---|---|---|
| 4,070,920 | 1/1978 | LeBlanc | 74/446 |
| 5,207,112 | 5/1993 | Sweetland et al. | 74/434 X |
| 5,657,666 | 8/1997 | Tsuda et al. | 74/443 X |

*Primary Examiner*—Allan D. Herrmann
*Attorney, Agent, or Firm*—Koda & Androlia

[57] ABSTRACT

According to the invention, when a plurality of radial ribs are formed integrally with the web of a spur gear for the sake of rigidity thereof, the same rigidity as that of heretofore known gears can be assured while increasing the size accuracy of gear in comparison with the usual gears by locating the ribs with outer ends thereof opposed to the base of corresponding teeth.

3 Claims, 5 Drawing Sheets

DB=1~1.5DA

GEAR

FIELD OF THE INVENTION

This invention relates to gears, and more specifically, is applicable to gears made from synthetic resin used mainly in precision machinery such as printers.

BACKGROUND OF THE INVENTION

Precision machinery such as printers is now manufactured with a lesser total weight by using gears made from synthetic resin. For the purpose of assuring sufficient rigidity and a higher precision thereof, such gears have their web formed in disc form, the disc having thereon reinforcing ribs.

With reference to FIG. 1 showing a spur gear applicable in this sort of precision machinery, the front view thereof is shown in FIG. 1(A), the cross-sectional view thereof taken on line A—A of FIG. 1(A) is shown in FIG. 1(B) and the rear view thereof is shown in FIG. 1(C).

The spur wheel 1 formed by injection molding of synthetic resin comprises a hub 2 having a length larger than face width b, and a web 3 of a disc form formed around the hub 2 and having a thickness smaller than the face width b. A circular rim 4 is formed around the web 3, and a predetermined number of teeth 5 are formed around the rim 4, wherein one end surface of the hub 2 is even with one end surface of the rim 4 while the other end surface of the hub 2 protrudes from the other end surface of the rim 4. Further, the web 3 is formed with a predetermined thickness around a virtual surface dividing the face width b into substantially equal parts. Accordingly, the spur gear 1 has a void space of less thickness between hub 2 and rim 4 on the both sides of the web 3, thereby to decrease the quantity of synthetic resin used and thus the total weight of gear for the quantity. Further, the web 3 is formed in disc shape, thereby to prevent a non-uniform deformation in the manufacturing process thereof so as to increase the accuracy of gear.

In the void space, spur gear 1 has a plurality of radial ribs 8A and 8B protruding from the hub 2 in order to assure its rigidity. More specifically, these ribs 8A and 8B are formed on both sides of the web 3 thereby to form a plate of total thickness of the face width b together with the web 3.

Further, the ribs 8A and 8B are arranged in axial symmetry with respect to a virtual line binding each gate 9 and the rotation axis of the hub 2 in consideration of resin fluidity, thereby to mold respective ribs with substantially same injection pressure. As described above, even number of ribs 8A and 8B are formed in general in this kind of spur gear 1, thereby to increase the rigidity of the web 3 having disc form for assuring the size accuracy of spur gear 1 thus obtained.

In this sort of spur gear 1, if its size accuracy can be increased further while maintaining its rigidity, an improvement of quality of printed characters can be expected from a printer for example using the spur gear 1.

SUMMARY OF THE INVENTION

It is an object of the present invention to provide a spur gear having a further improved size accuracy while keeping substantially the same rigidity as heretofore known gears.

For achieving the above described object, the present invention provides a gear comprising a rim having located thereon a plurality of teeth with a determined pitch, a web having a disc form for connecting the rim and the hub, and a plurality of ribs formed integrally with the web for connecting the rim and the hub, the gear characterized in that outer ends of the ribs are located respectively opposed to the base of corresponding teeth.

In the gear having the construction as described above, when a plurality of radial ribs are formed integrally with the web for he sake of rigidity, the same rigidity as that of heretofore known gears can be assured while increasing the size accuracy of gear in comparison with the conventional gears due to locating manner of the ribs with outer ends thereof opposed to the base of corresponding teeth.

In this case, it is preferable to select the number of the teeth at an integer multiple of the number of the ribs; and the ribs are located with an equal central angle with respect to the rotational center of the hub.

Otherwise, the number of the teeth may be selected at a number different from an integer multiple of the number of the ribs; and the ribs may be shifted from their position corresponding to the equal central angle with respect to the rotational center of the hub.

When constituting a gear comprising a rim having located thereon a plurality of teeth with a predetermined pitch and a disc-formed web for connecting the rim and the hub of gear, the accuracy of gear can be improved with a smaller quantity of resin used. Further, when ribs are formed integrally with the web for connecting the rim and the hub, the rigidity of gear itself can be further increased. However, when the outer ends of the ribs are located opposed to the space between the teeth, contraction effect of these ribs at molding process of synthetic resin causes a traction force of a rib against the teeth adjacent to the rib, thereby to deform the gear in such a manner to decrease the pitch between the adjacent teeth. On the other hand, when outer ends of ribs are located opposed to the base of teeth, such a decrease of pitch between the teeth can be efficiently prevented.

DETAILED DESCRIPTION OF THE PREFERRED EMBODIMENTS

Embodiments of the present invention are described hereinafter referring to the attached drawings.

Figure 1A:
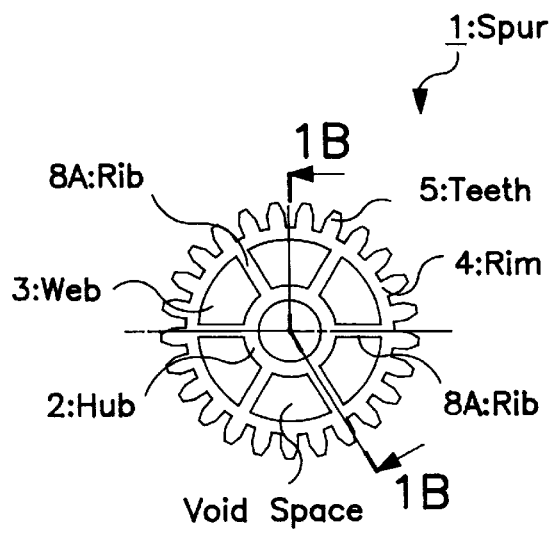
FIGS. 1 (A), (B) and (C) are respectively front view, cross-sectional view and rear view of heretofore known spur gear.
Figure 1B:
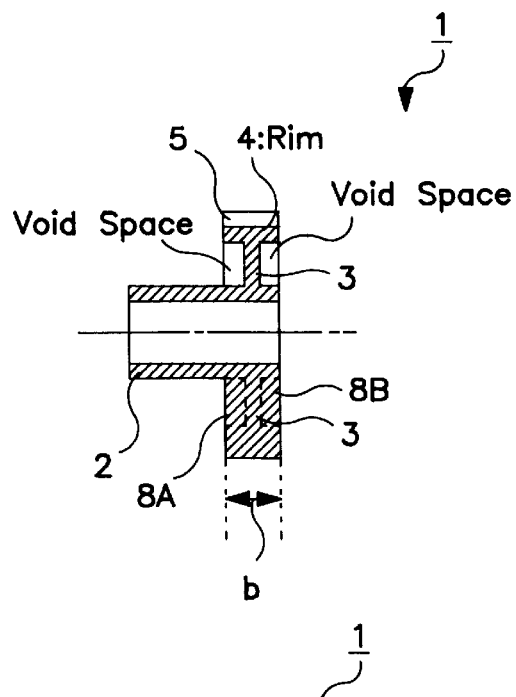
Figure 1C:
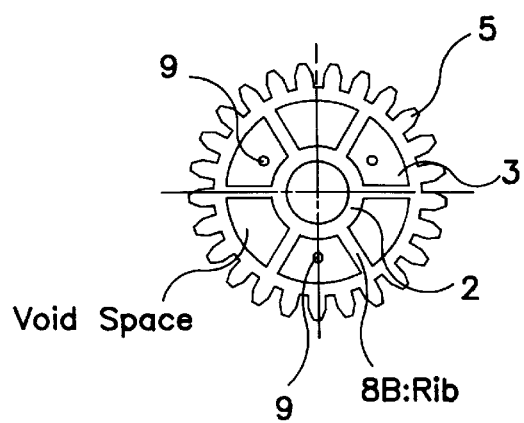
Figure 2A:
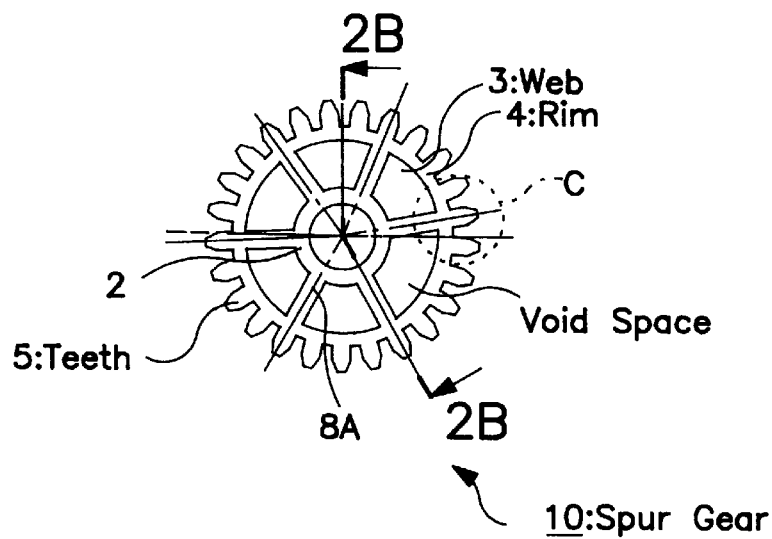
FIGS. 2 (A), (B) and (C) are respectively front view, cross-sectional view and rear view of a spur gear according to an embodiment of the present invention.
Figure 2B:
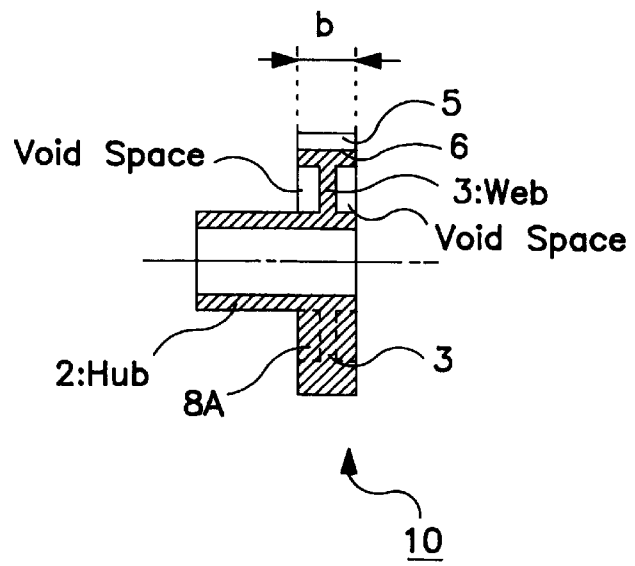

FIG. 2 shows an embodiment of spur gear 10 according to the present invention in comparison with spur gear 1 shown in FIG. 1, wherein the same components as those in FIG. 1 are shown with the same reference numbers while the same description thereof is omitted.

In the spur gear 10, the number of teeth 5 is not even number times of the number of ribs 8A and 8B, so that at least one pair of the ribs 8A and 8B (in this embodiment, ribs confined in circle C in FIG. 2(A)) is shifted from the position corresponding to equal central angles, thereby to locate all the outer ends of ribs 8A and 8B against respective bases of corresponding teeth 5 for coupling the ends of ribs to the inner side edge of the rim 4.

Figure 3:
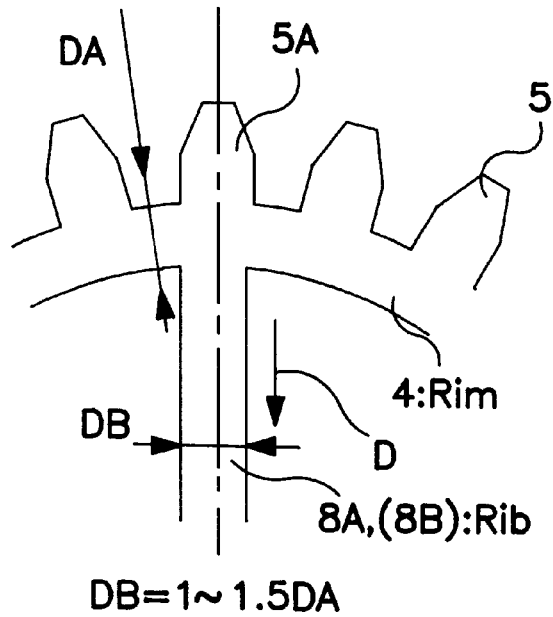
FIG. 3 is a partially enlarged plan view of the spur gear shown in FIG. 2.

More specifically, as shown in FIG. 3 which is an enlarged view of the circle C of FIG. 2(A), the outer ends of respective ribs 8A and 8B are located against the bases of respective teeth 5 so as to cause the center lines of the ribs coincide with the corresponding center lines of teeth 5. In the manufacturing process of this spur gear 10, ribs 8A and 8B are first temporally located on both sides of web 3 in an overlapping manner with the same central angle. The outer end of any one of these temporally located ribs 8A and 8B is then located to be opposed to the base of a tooth 5. When continuing the same process, if there occurs a rib 8A or 8B which can not coincide at its outer end with any base of a tooth 5, this rib 8A or 8B is shifted until it coincides with the base of the nearest tooth 5, the position of the rib thus obtained being set as the normal locating position thereof. The construction of spur gear 10 thus manufactured is such that the outer ends of ribs 8A and 8B are located opposed respectively to the bases of teeth 5 with a small change of resin injection pressure in comparison with the manufacturing of spur gear 1 in which all the ribs 8A and 8B are located with equal central angle.

Further, owing to such a location of pairs of ribs 8A and 8B, respective ribs of the same rib pair allocated to the both side surfaces of web 3 are located with their outer ends opposed to the base of the same tooth 5. Additionally, the number of teeth in this spur gear 10 is twenty five (25), which is different from the even times of the number of ribs 8A, i.e. six (6).

Further, respective ribs 8A and 8B have a thickness DB which is 1–1.5 times larger than thickness DA measured from tooth bottom to the internal surface of rim 4, so that components such as rim 4 and teeth 5 can be cooled in a well balanced manner in the injection molding of spur gear 10.

Figure 2C:
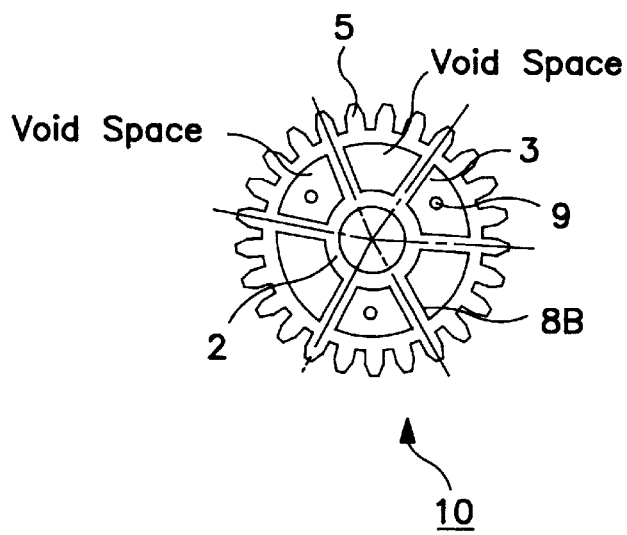

When using the structure of spur gear 10 described above, one side surface of web 3 has formed therein three gates 9 (FIG. 2(C)) having a central angle of 120 degrees between them, through which resin is poured in mold to be cooled therein, then molded resin is rapped therefrom. Since web 3 is formed in disc form, rim 4 and respective teeth 5 shrink in a uniform manner with respect to the rotational center of hub 2, thereby to prevent effectively the degradation of size accuracy of spur gear. Since web 3 has a thickness smaller the thickness b of tooth 5 thereby to form a void space, a lighter weight of spur gear is formed with smaller quantity of resin, with an increased rigidity due to ribs 8A and 8B combining hub 2 and rim 4.

Figure 4:
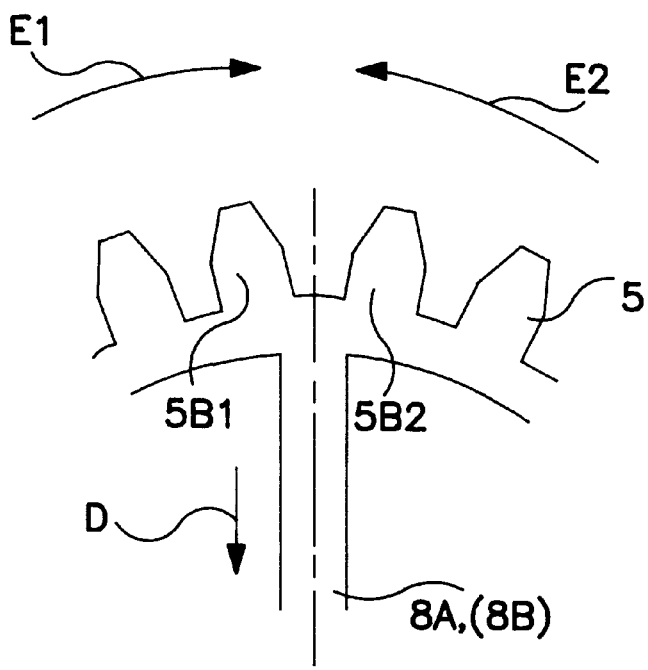
FIG. 4 is a same view as FIG. 3 showing a portion of heretofore known spur gear.

When molding and cooling process, since the portion of web 3 having thereon ribs 8A and 8B and the other portions having no ribs thereon have different cooling rates, the ribs 8A and 8B shrink in a direction D as shown in FIG. 3 so as to pull the rim 4 inwards, thereby to decrease non-uniform shrinkage in the web 3. On the other hand, when considering the structure as shown in FIG. 4, since outer ends of respective 8A and 8B are located in such a manner to be opposed to the space between teeth 5B1 and 5B2, the teeth 5B1 and 5B2 adjacent to the ribs 8A and 8B are shifted so as to approach each other as shown by arrows E1 and E2 respectively due to the shrinkage of ribs 8A and 8B, so that the pitch in this portion of teeth becomes narrower than those of other portions of teeth. Accordingly, the size accuracy of the heretofore known spur gear 1 (FIG. 1) is decreased thereby.

On the contrary, in the embodiment according to the invention, even when the ribs 8A and 8B are shrunk, only a little inward shifting of tooth 5A corresponding to these ribs 8A and 8B is caused thereby so as to maintain the pitch of teeth and to increase the accuracy of gear to a higher level.

Further, thickness DB of the ribs 8A and 8B is selected approximately 1 to 1.5 times larger than thickness DA measured from the bottom of teeth to the internal surface of rim 4, so that the ribs 8A and 8B can be efficiently cooled in a well-balanced manner with respect to the rim 4, tooth 5 and the other portions. Therefore, a non-uniform shrinkage between the ribs 8A and 8B and the portion of the web 3 on which no ribs are located is enough decreased to increase the size accuracy of spur gear.

Further, the ribs 8A and 8B are shifted from their temporary positions with equal central angle and are located with their outer ends opposed to the base portion of the nearest tooth 5. Accordingly, the ribs 8A and 8B can be molded with substantially equal pressure when molding the spur gear 10, so as to sufficiently prevent a non-balanced deformation of spur gear 10 which would be caused by shifting of ribs 8A and 8B.

Figure 5:
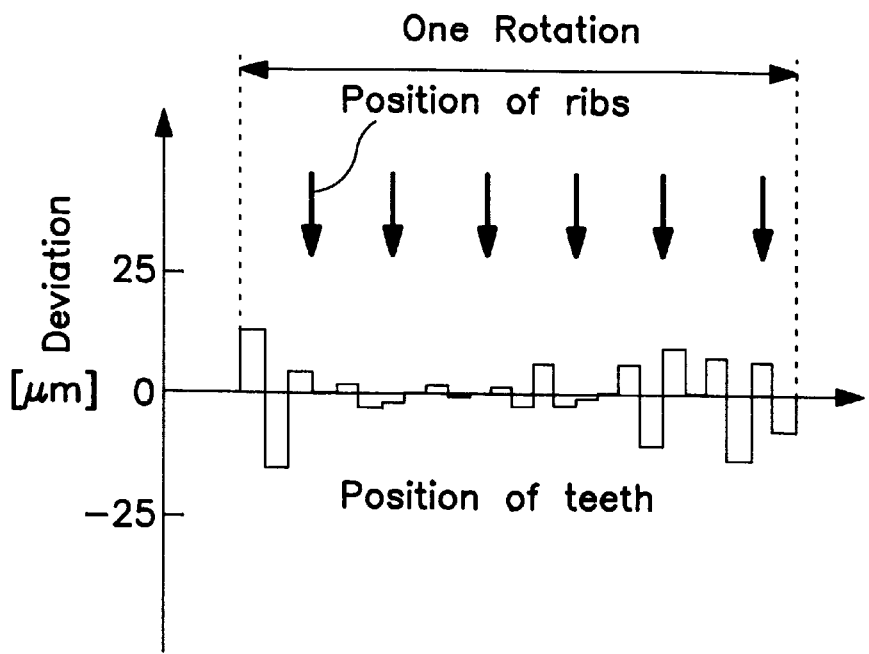
FIG. 5 is a characteristic curve showing the measured error of pitch between respective teeth in the heretofore known spur gear.
Figure 6:
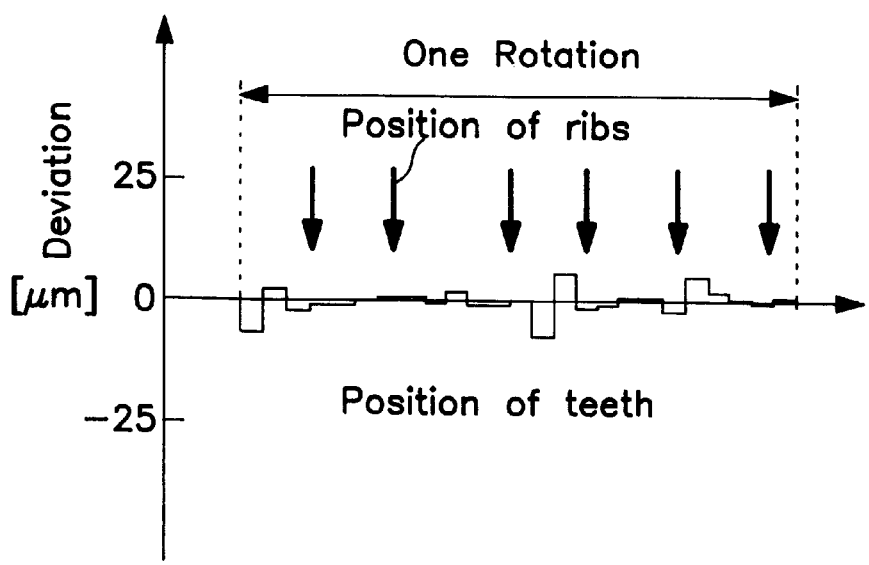
FIG. 6 is a characteristic curve similar to FIG. 5 showing the measured error of pitch between respective teeth in the spur gear shown in FIG. 2.

FIG. 5 is a graph showing measured deviation value of gear pitch between respective teeth 5 in the heretofore known spur gear 1 shown in FIG. 1 with respect to designed value of the gear pitch, while FIG. 6 is a graph showing the same deviation value in the spur gear 10 according to the invention shown in FIG. 2. It is clear from these graphs that the largest deviation from the designed value of gear pitch between teeth 5 is 17.1 micrometers in the case of FIG. 5 while on the other hand the deviation is considerably decreased to 5.9 micrometers in the case of FIG. 6 according to the invention, thus establishing an increase of size accuracy in the spur gear 10 according to the invention.

Figure 7:
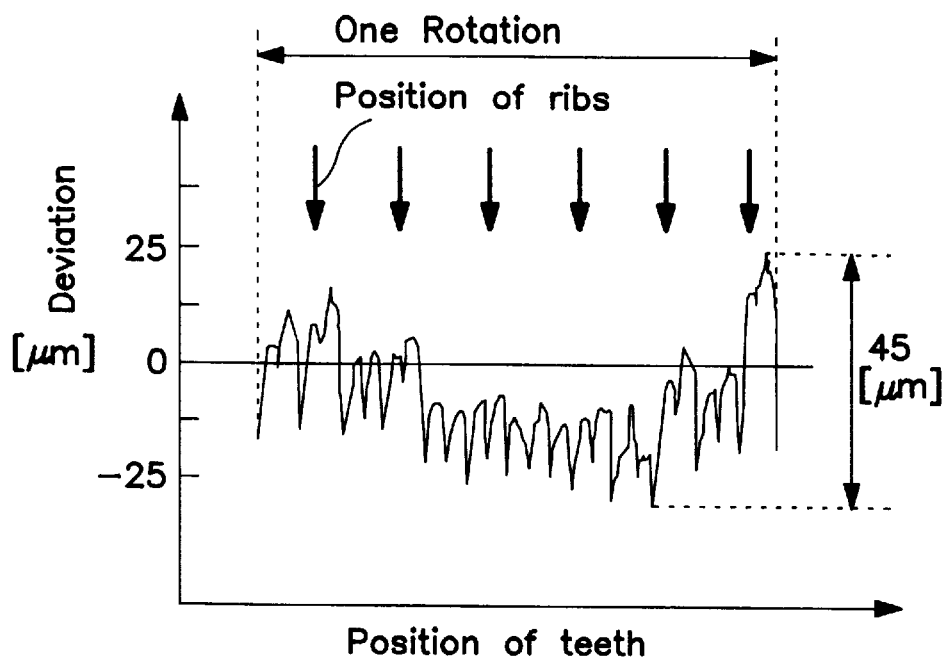
FIG. 7 is a characteristic curve showing the measured results of intermeshing test for the heretofore known spur gear.
Figure 8:
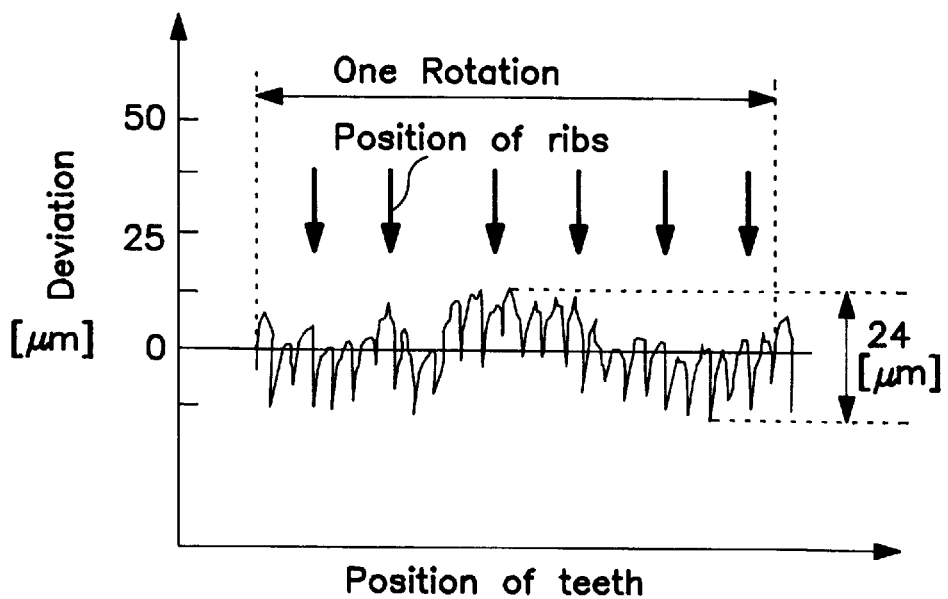
FIG. 8 is a characteristic curve showing the measured results of intermeshing test for the spur gear shown in FIG. 2.

In the measurement of intermeshing accuracy, i.e. when measuring the shift of rotational shaft of a gear for measurement use having a high accuracy of teeth and intermeshed with spur gears to be tested, the largest deviation of shaft of the measurement gear per one rotation is 45 micrometers as shown in FIG. 7 with respect to the heretofore known spur gear shown in FIG. 1, while the same deviation of shaft could be decreased to 24 micrometers as shown in FIG. 8, thus establishing again an increase of size accuracy in the spur gear 10 according to the invention.

In the above described construction, it is thus possible to maintain the same strength as the heretofore known construction with an increased size accuracy of spur gear by shifting ribs 8A and 8B from their position with equal central angle when locating the ribs on the web 3 having disc form and by connecting the outer ends of the ribs 8A and 8B to the rim 4 with the outer ends opposed to the base of corresponding tooth 5.

Further, the outer ends of the ribs 8A and 8B on the both side surfaces of the web 3 are located opposed to the base of corresponding tooth 5 in the above described embodiments. However, it is possible in the scope of the invention to locate the ribs 8A and 8B on both side surfaces of web 3 in a non-overlapping or shifted relational position to each other.

Further, while the ribs are located on both side surfaces of web 3 in the above described embodiments, the present invention is not limited to such a construction, but can be applied to the case where the ribs are located only on a single side surface of web 3.

Further, in the above described embodiments, numbers of teeth and ribs are respectively selected equal to 25 and 6, i.e. the number of teeth is different from an integer multiple of the number of ribs. The present invention is not limited thereto and can be applied to the case where the number of teeth is selected to an integer multiple of the number of ribs. Further in this case, it is possible to automatically oppose the outer ends of ribs located with an equal central angle respectively to the base of the corresponding teeth. In this case, it is also possible to prepare a mold with the same manufacturing process as before.

Further, the embodiments described above relate to the spur gear. However the present invention is not limited thereto and can be applied also to various kinds of gear such as helical gear, double helical gear, worm wheel and screw gear.

What is claimed is:

1. A gear comprising:
   a rim having located thereon a plurality of teeth with a determined pitch, each of said plurality of teeth having a base provided on said rim,
   a web having a disc form for connecting said rim and a hub, and
   a plurality of ribs formed integrally with said web for connecting said rim and said hub, and wherein
      outer ends of said plurality of ribs at said rim are located respectively opposed to the base of corresponding ones of said plurality of teeth,
   said gear is molded entirely of synthetic resin, and
   gates for molding said gear are formed in the web.

2. A gear according to claim 1 wherein;
   the number of said teeth is selected at an integer multiple of the number of said ribs; and
   said ribs are located with an equal central angle with respect to the rotational center of said hub.

3. A gear according to claim 1 wherein;
   the number of said teeth is selected at a number different from an integer multiple of the number of said ribs; and
   said ribs are shifted from their position corresponding to the equal central angle with respect to the rotational center of said hub.

* * * * *